A. H. RUMPLE.
SAWING MACHINE.
APPLICATION FILED APR. 3, 1919.
1,335,798.
Patented Apr. 6, 1920.
2 SHEETS—SHEET 1.
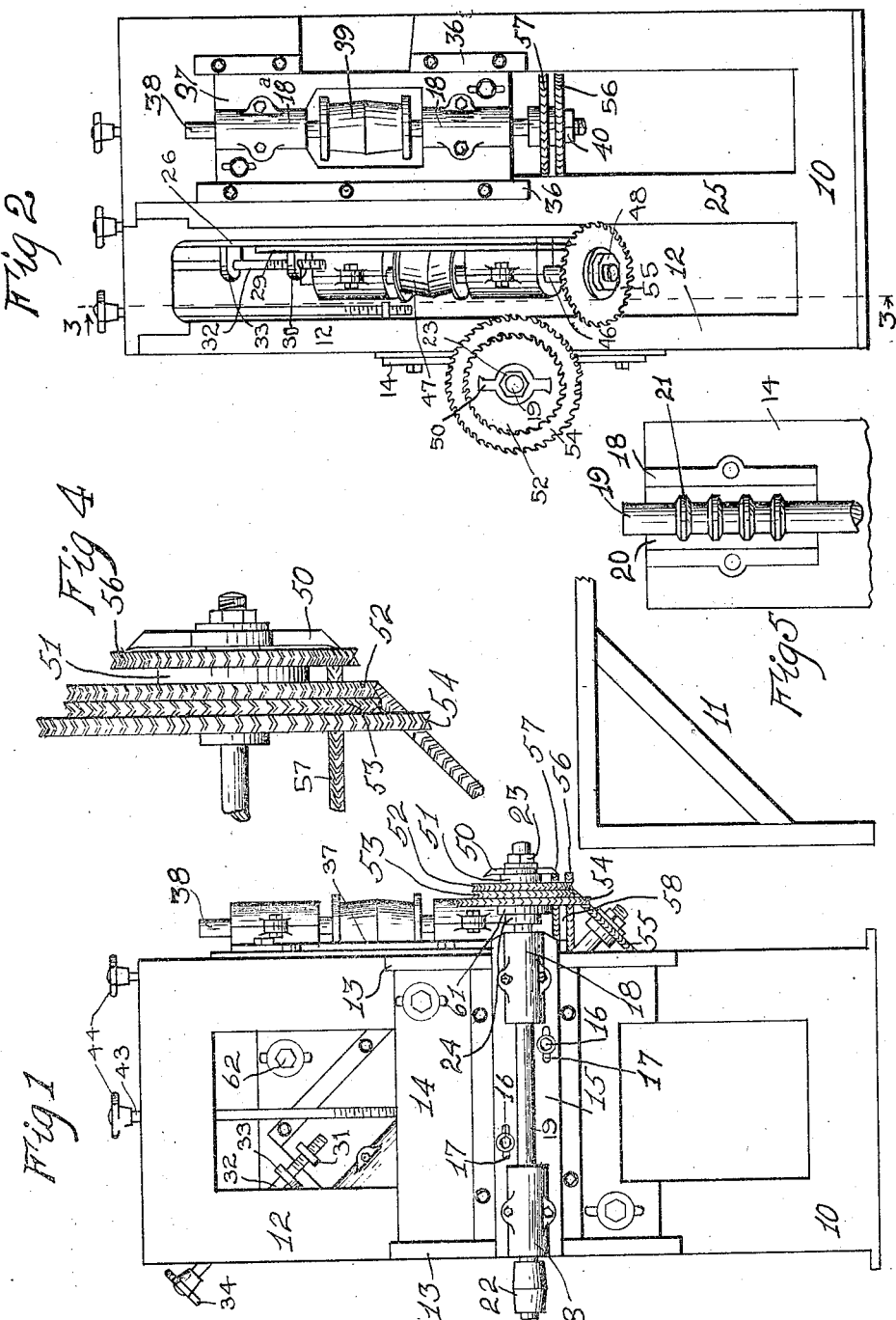
Witness
Nevin A Trissel
Inventor
Alva H. Rumple.
By Orwig & Bair Attys A. H. RUMPLE.
SAWING MACHINE.
APPLICATION FILED APR. 3, 1919.
1,335,798.
Patented Apr. 6, 1920
2 SHEETS—SHEET 2.
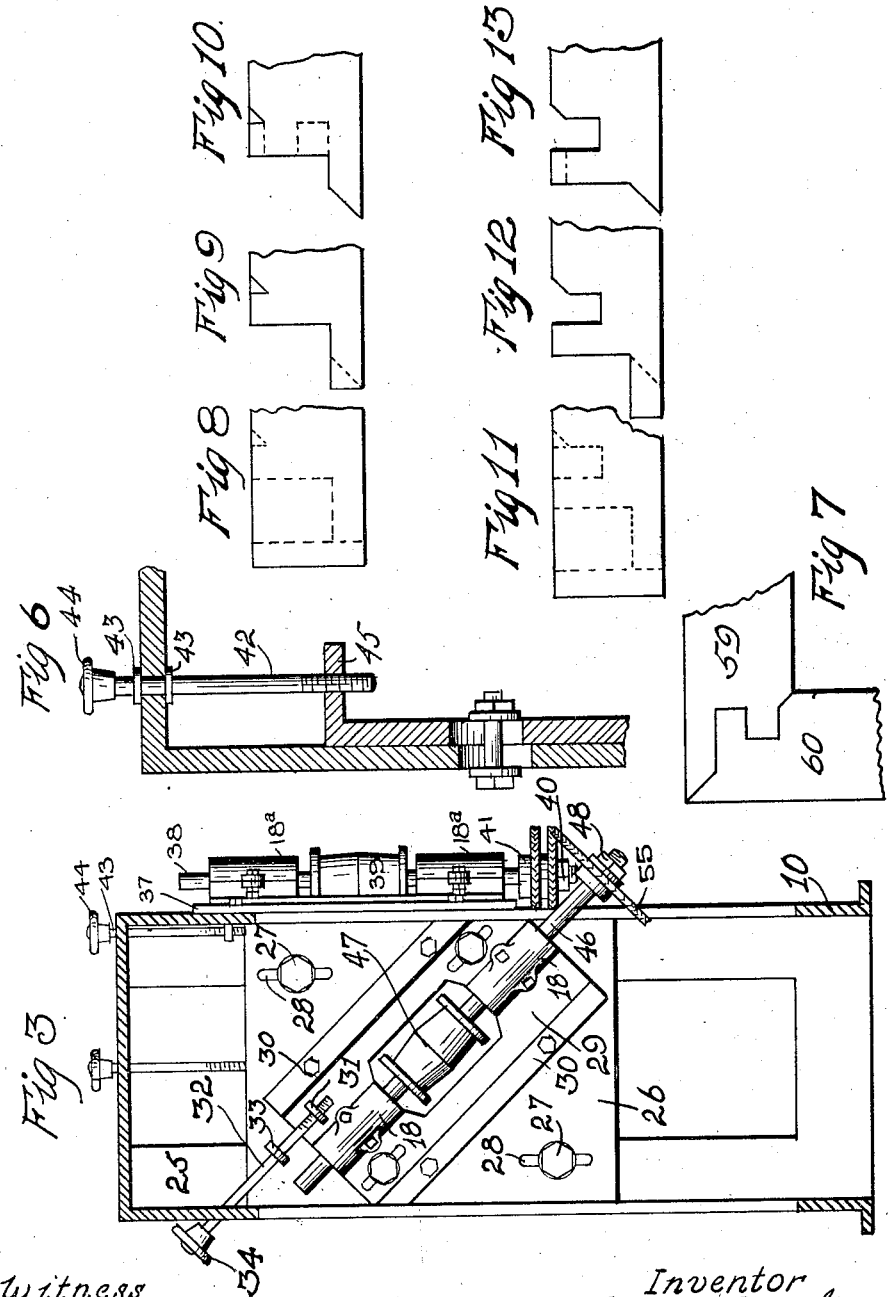

UNITED STATES PATENT OFFICE.

ALVA H. RUMPLE, OF DES MOINES, IOWA.

SAWING-MACHINE.

1,335,798.  Specification of Letters Patent.  Patented Apr. 6, 1920.

Application filed April 3, 1919. Serial No. 287,341.

*To all whom it may concern:*

Be it known that I, ALVA H. RUMPLE, a citizen of the United States, and resident of Des Moines, in the county of Polk and State of Iowa, have invented a certain new and useful Sawing-Machine, of which the following is a specification.

The object of my invention is to provide a sawing machine of simple, durable and inexpensive construction.

More particularly it is my object to provide a sawing machine wherein a frame is provided, designed to carry shafts upon which are mounted cutting devices which are so placed that material to be tenoned and grooved may be moved along the frame to successively engage the cutting devices and thereby form the completed joint.

A further object of my invention is to provide such a machine designed to selectively receive cutting devices for forming either portion of a joint, to thereby insure an accurate fitting of the parts.

Still a further object of my invention is to provide cutting devices which may be readily changed from one shaft to another shaft to form grooves opening selectively either laterally or upwardly, so that the groove may be uniform on both of the members which are to be joined together.

Still a further object is to provide certain of the cutting devices in such positions that they may be used for cutting coacting surfaces on both members of the joint without readjustment, to thereby further insure accurate fitting.

Still a further object of my invention is to provide a cutting device designed to form a beveled surface adjacent to the upper edge of the material to be joined, so that materials of different thicknesses may be joined together without extending parts which would prevent a tight fitting of the joint.

Still a further object of my invention is to provide cutting devices designed to form beveled surfaces adjacent to the upper and lower edges of the material being joined, and to provide coacting tongues and grooves between said beveled surfaces to prevent movement of one part of the joint relative to the other, both by providing tongues and grooves and by providing an increased area to which glue may be applied for fastening the parts together.

Still a further object is to provide a plurality of rotary cutting devices of equal thickness, and a plurality of collars of similar thickness designed to be placed between the cutting devices to space them apart so that the various cutting devices may be readily interchanged, and the tongues and grooves formed respectively by the coaction of the collars and cutting devices may be of uniform width.

Still a further object is to provide a frame having a plurality of shafts mounted therein with their axes in spaced vertical planes and forming angles with each other, whereby the cuts made may form surfaces lying in planes at proper angles with each other.

Still a further object is to provide means for adjusting the relative positions of said shafts so that the cutting devices thereon may be moved to positions where they will cut the tongues, grooves and beveled surfaces to properly position the latter.

Still a further object of my invention is to provide a frame having a horizontal shaft and a vertical shaft therein, with cutting devices so arranged on these shafts that a single cutting device may be moved from one shaft to the other shaft without substantial disarrangement of the remaining cutting devices in order to adjust the machine for cutting members for either portion of the joint.

With these and other objects in view, my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a side elevation of the machine embodying my invention.

Fig. 2 shows a front elevation of the machine, with the work supporting table removed.

Fig. 3 shows a vertical sectional view taken on the line 3—3 of Fig. 2.

Fig. 4 shows an enlarged detail view of a portion of the cutting devices, illustrating their arrangement for cutting the second part of the mortise joint.

Fig. 5 shows an enlarged detail view of a bearing for the shafts which carry the cutting devices.

Fig. 6 shows an enlarged detail view of the means for adjusting the vertical position of the shafts.

Fig. 7 is a top or plan view of two pieces of material joined together with the form of joint which is cut with my improved machine; and Figs. 8 to 13 illustrate the cuts made in the material during the movement of the material past the various cutting devices.

Referring to the accompanying drawings, I have used the reference numeral 10 to indicate generally the rectangular frame upon which my cutting devices are mounted, and the reference numeral 11 for indicating generally the work supporting platform adjacent thereto.

The frame 10 is provided with three spaced vertical partitions 12, 25 and 35 which are designed to carry the three shafts which support the cutting devices. The left-hand partition 12 carries spaced parallel guides 13, on which is mounted a plate 14. The plate 14 carries a second plate 15, which is mounted thereon by means of bolts 16 and coacting slots 17 designed to permit horizontal adjustment of said plate.

Secured to the plate 15 are horizontal bearing members 18, in which is journaled a shaft 19. The bearing members 18 are of the type known as thrust-bearings, in order to prevent longitudinal play of the shaft 19, and are illustrated in Fig. 5, wherein the bearing 18 is provided with the babbitting 20 having spaced annular grooves therein, designed to receive annular ribs 21 formed on the shaft 19. At the rear end of the shaft 19 a pulley 22 is mounted.

The forward end of the shaft 19 is screw-threaded to coact with a locking nut 23. Spaced inwardly from the locking nut 23 a collar 24 is fixed to the shaft.

On the central partition 25 of the frame 10 a plate 26 is mounted for vertical reciprocation by any suitable means, such, for instance, as the bolts 27 and slots 28. Inclined downwardly and forwardly across the face of the plate 26 is a plate 29 which is slidably mounted in guides 30. The plate 29 may be adjusted relative to the guides 30 by the following mechanism.

An ear 31 extends laterally from the plate 29 and is screw-threaded to receive a screw-threaded rod 32 which is slidably but non-rotatably mounted in an ear 33 extended laterally from the plate 26. The rod 32 is extended to position outside the frame 10, where a hand wheel 34 is mounted thereon to turn the rod 32 to thereby adjust the plate 29.

Mounted on the partition 25 and the right hand partition 35 are vertical guides 36 designed to slidably receive a plate 37 on which is mounted a shaft 38. The bearings 18ª are provided adjacent to either end of the plate 37 to carry the shaft 38 and a pulley 39, adjacent to which is a break in the partition 35 so that a belt extended over the pulley 39 will not rub against the partition member. The shaft 38 is provided with a screw-threaded end having a locking nut 40 adapted to coact with threads thereon, and a fixed collar 41 spaced upwardly from said nut.

The plates 14, 26 and 37 are each designed to be adjusted vertically by means of a screw-threaded rod coacting with the extending ears, as is shown in Fig. 6.

As all of these controls are similar, only one will be described.

In each case a rod 42 having a screw-threaded end is rotatably but nonslidably mounted in the top of the frame 10, as by means of collars 43 fixed to the rod. At the upper end of the rod a hand wheel 44 is secured, and an extension 45 from the respective plates has a screw-threaded opening therein designed to receive and to coact with the threads on the rod 42. In each case the plates are secured to the frame members adjacent thereto by means of guides or slots having bolts received therein to direct the sliding movement thereof.

On the plate 29 the bearings 18 support a shaft 46 upon which is mounted a pulley 47. One end of the shaft 46 is provided with a lock nut 48 and collar 49 spaced therefrom, similar to those provided for the shafts 38 and 19.

From the description of the foregoing parts it will be seen that the shafts 19, 38 and 46 are all arranged with their axes in spaced vertical planes, but that the axis of each shaft forms an angle with the axis of each of the other shafts. By this construction it is possible to form surfaces on the end of the material to be joined, which form angles relative to each other.

In the preferred form of my invention the shafts are arranged respectively in horizontal and vertical positions, and inclined to an angle of forty-five degrees. I provide cutting devices arranged as follows, to be mounted on the respective shafts, where they are held in position by means of the lock nuts and collars spaced therefrom.

On the horizontal shaft 19 I provide a cutting device 50 adjacent to the lock nut 23, designed to form a bevel, a washer 51 adjacent thereto, a pair of cutting devices 52 and 53 adjacent to the washer, and a somewhat larger cutting device 54 adjacent to the last described devices.

Referring to Fig. 8 it will be seen that the cutting devices just described will form cuts in material placed on the platform 11, as indicated by the dotted lines in this figure.

On the shaft 46 I secure a cutting device 55 which forms a beveled surface on the material to be joined, adjacent to the lower edge thereof, as indicated by the dotted line in Fig. 9.

On the shaft 38 I secure cutting devices 56 and 57, which are spaced from each other by means of a washer 58 and arranged to form the cuts in the material indicated by the dotted lines in Fig. 10.

From the arrangement of the cutting devices just described, it will be seen that they will cut the material to form the part 59 of the joint shown in Fig. 7.

When it is desired to cut the part 60 of the joint shown in Fig. 7, a washer 61 mounted on the shaft 19 between the collar 24 and the cutting device 54, is removed, and the cutting devices 54, 52 and 53 and the washer 51 are moved rearwardly on the shaft 19 until the cutting device 54 abuts against the collar 24. The cutting device 56 is then removed from the shaft 38 and placed on the shaft 19 against the washer 51, and the cutting device 50 and washer 23 placed on the shaft 19 in front of the cutting device 56. If desired the washer 61 may then be placed on the shaft 38 and the lock nut thereon screwed to position to retain the cutting device 57 from movement.

When the parts are so arranged it will be seen that the cutting devices 50, 56, 52, 53 and 54 disposed on the horizontal shaft 19, will make the cuts in material placed on the platform 11, indicated by the dotted lines in Fig. 11.

As the material is moved rearwardly to contact with the cutting device 55, the cut indicated by the dotted line in Fig. 12 will be made, and as the material is moved to contact with the cutting device 57 the cut indicated by the dotted line in Fig. 13 is made, thereby completing the part of the joint numbered 60 in Fig. 7.

From the description of the parts just mentioned, it will be seen that when it is desired to change the cutting devices from the arrangement shown in Fig. 1 to that shown in Fig. 4, it is only necessary to slide off the cutting devices from the shaft 19 to remove the collar 61, and then replace said cutting devices except the beveling device 50. Then the cutting device 56 is removed from the shaft 38 and placed on the shaft 19 between the washer 51 and the cutting device 50.

It will thus be seen that there is substantially no danger that the parts will become disarranged to thereby cause irregularities in the cutting of the grooves, tongues and bevels which would result in improper fitting of the joint.

It will also be noted that by the arrangement of the parts described, I provide a wooden tongue adapted to coact with the corresponding groove, so that the two parts of the joint can only be disposed in one direction unless the wood is broken. The arrangement also provides a comparatively large surface adapted to receive glue to hold the parts together, so that the danger of dislodgment is comparatively slight.

My machine is especially designed for use with red cedar lumber, which is subject to a large proportion of imperfections and which is very expensive. On account of the large number of imperfections and the expense of the wood, it is oftentimes possible to secure a superior surface on the wood by varying the thickness somewhat. With my improved sawing machine for preparing joints it will be seen that where the wood does vary in thickness, either the cutting device 50 or the cutting device 57 will remove the excess thickness so that it will not interfere with a close fitting joint.

The outer corner of the joint is also beveled, and this beveling is always made by the same cutting device for both parts of the joint, so that a uniform angle is always attained to insure a close fit.

Means are provided for adjusting the vertical position of each of the shafts which carry the cutting devices, and the horizontal position of the shafts 46 and 19 may be varied so that the cutting devices thereon may be adjusted to their proper relative positions.

In addition to the hand wheels and rods 42 for adjusting the positions of these shafts, I preferably provide bolts 62 which coact with slots in the plates and partition members of the frame, to guide the plates carrying the shafts and to lock them from movement.

Some changes may be made in the construction and arrangement of the various parts of my device, without departing from the essential features and purposes of my invention, and it is my intention to cover by my claim any modified forms of structure or use of mechanical equivalents which may be reasonably included within their scope.

I claim as my invention:

In a sawing machine for making tenoned joints, a frame, cutting devices thereon for cutting stock advanced in a horizontal plane, comprising a horizontal shaft having thereon a stop member, a spacer sleeve, a cut-off saw, cutting means adjacent to said saw, a second spacer sleeve and a bevel cutter, an inclined shaft having thereon a saw for cutting a bevel, a vertical shaft having thereon spaced removable saws substantially as described, whereby one member of a tenoned joint may be cut, the parts being so arranged that said first spacer sleeve may be removed, said first saw, cutting means and second sleeve moved longitudinally on said first shaft and one of said last saws placed between the second spacer sleeve and the bevel cutter, whereupon the parts will be arranged for cutting the second member of a joint.

Des Moines, Iowa, March 19, 1919.

ALVA H. RUMPLE.